United States Patent [19]
LaMay et al.

[11] Patent Number: 5,377,937
[45] Date of Patent: Jan. 3, 1995

[54] AIRCRAFT FLARE CONTROL SYSTEM UTILIZING AN ENVELOPE LIMITER

[75] Inventors: Brian K. LaMay, Seattle; Asamitsu Maeshiro; William F. Shivitz, both of Renton, all of Wash.

[73] Assignee: The Boeing Company, Seattle, Wash.

[21] Appl. No.: 754,083

[22] Filed: Sep. 3, 1991

[51] Int. Cl.6 .................... G06F 15/50; G05D 1/02; B64C 13/18
[52] U.S. Cl. ................... 244/185; 244/195; 364/428; 364/430; 364/433; 318/583
[58] Field of Search ............... 244/177, 181, 185, 186, 244/187, 194, 195; 364/428, 429, 430, 433, 435; 318/583, 584

[56] References Cited

U.S. PATENT DOCUMENTS

| | | | |
|---|---|---|---|
| 2,800,292 | 7/1957 | Moseley | 318/583 |
| 3,333,795 | 8/1967 | Hattenderf et al. | |
| 3,578,268 | 5/1971 | Kramer | |
| 3,678,256 | 7/1972 | Harenberg, Jr. | |
| 3,694,908 | 10/1972 | Eggert et al. | |
| 3,742,325 | 6/1973 | Andresen, Jr. | 318/584 |
| 3,875,379 | 4/1975 | Vietor | 244/185 |
| 3,887,148 | 6/1975 | Devlin | 364/429 |
| 3,911,436 | 10/1975 | Schanzer et al. | 364/429 |
| 3,980,258 | 9/1976 | Simeon | 244/182 |
| 4,006,871 | 2/1977 | Simpson | 364/428 |
| 4,093,159 | 6/1978 | Gilson | |
| 4,347,572 | 8/1982 | Berwick, Jr. et al. | 364/433 |
| 4,354,237 | 10/1982 | Lambregts et al. | |
| 4,419,732 | 12/1983 | Lambregts et al. | |
| 4,536,843 | 8/1985 | Lambregts | |
| 4,956,780 | 9/1990 | Sankrithi et al. | |
| 5,224,664 | 7/1993 | Adams, Sr. et al. | 244/194 |

Primary Examiner—Michael S. Huppert
Assistant Examiner—Lissi Ansley
Attorney, Agent, or Firm—James P. Hamley

[57] ABSTRACT

An aircraft autoland flare control system which augments the autopilot's aircraft flare control commands in the event the aircraft exceeds defined flare envelopes, monitors aircraft longitudinal position, altitude, altitude rate, lateral position and lateral position rate during flare, and outputs commands to correct aircraft position thus minimizing touchdown dispersion in both the longitudinal and lateral axes. When the aircraft deviates from the flare envelopes, such as may be due to extreme atmospheric conditions such as wind gusts, a signal commanding pitch or roll correction is output to the pitch or roll control loop which subsequently acts to adjust aircraft position such that the aircraft's flarepath is returned to within the flare envelopes.

22 Claims, 7 Drawing Sheets

AIRCRAFT FLARE CONTROL SYSTEM UTILIZING AN ENVELOPE LIMITER

BACKGROUND OF THE INVENTION

The present invention relates to the aircraft flight control art and, more particularly, to an aircraft flare control system which utilizes a flare envelope limiter.

A critical portion of aircraft landing trajectory is commonly known as flare out or flare. Flare is that portion of the landing trajectory between the fixed angle glideslope and aircraft runway touchdown. Thus, it is desirable, particularly for commercial aircraft, that the flare profile depart smoothly from the fixed angle glideslope approach, thereby providing a smooth transition to runway taxiing.

Aircraft automatic landing flare performance is determined by flare control circuitry which is commonly built into the autopilot. In order to make acceptable autolands under adverse environmental conditions, the autoland system must precisely control the flare path. Regulatory agencies define longitudinal and lateral "footprints" within which the aircraft must touchdown under various conditions. In general, simple basic flare control laws can meet such requirements. However, under certain severe wind conditions which induce aircraft drift, the simple control laws fail to guide the planes down within the specified footprints.

One solution to the above problem is to increase the flare control law loop gain, so that the system controls the flare path more precisely. A drawback to this approach, however, is that a high flare path loop gain creates an unacceptable high frequency oscillation on the control column or wheel which is objectionable to the pilot.

Yet another approach to providing an improved flare control is to modify the flare biases (constants) or adjust the biases depending upon flight conditions at flare entry. This so called "open loop" approach is limited in its ability to control the flare path, especially when a severe wind disturbance occurs during the flare maneuver. Also, extremely complex control laws are required to control flare paths in severe environmental conditions.

Thus, there has been a long-felt need in the aircraft guidance control art for an improved aircraft flare control.

SUMMARY OF THE INVENTION

It is an object of the present invention, therefore, to provide an improved aircraft flare control system which assures aircraft touchdown within the designated footprint even under severe wind conditions.

Briefly, according to the invention, a control system is provided for directing aircraft flight path during flare to a runway. The system comprises input means which is adapted to receive predetermined aircraft flight path status signals. Also included is a processing means which processes the input status signals and produces output control signals which are adapted to be coupled to aircraft actuators to control aircraft flight along a nominal flare path. The processing means includes means for defining an aircraft flare envelope, comparing the aircraft's actual flight path with the flare envelope and, in the event the aircraft is outside of the flight envelope, predeterminedly revising the output control signals to redirect the aircraft's flight path such that the aircraft returns within the flare envelope.

In a further aspect of the invention, the processing means includes means for defining the flare envelope as upper and lower altitude limits as a function of the longitudinal position of the aircraft. The processing means then compares the aircraft's actual altitude with the corresponding upper and lower altitude limits at the aircraft's actual longitudinal runway position. In the event the aircraft is outside of these limits, the processing means predeterminedly revises the output control signals to command a revised aircraft pitch, whereby the aircraft is directed to pitch up or down as appropriate to bring the aircraft's flight path within the flare envelope limits.

In a further aspect of the invention, the processing means also comprises means for further defining the flare envelope as having upper and lower altitude rate limits as a function of the aircraft's longitudinal position. The aircraft's actual altitude rate is compared with these upper and lower altitude rate limits at the aircraft's actual longitudinal position and, in the event the aircraft's altitude rate is outside of the altitude rate envelope limits, the processing means predeterminedly revises the output control signals to command a revised aircraft pitch, whereby the aircraft is directed to pitch up or down as appropriate to bring its flight path within the flare envelope limits.

In yet a further aspect of the invention, the processing means further comprises means for further defining the flare envelope as including a lateral flare envelope term having left and right lateral position limits as a function of the longitudinal position of the aircraft. The aircraft's actual lateral position is compared with the left and right lateral envelope limits at the aircraft's actual longitudinal position and, in the event the aircraft is outside of the lateral limits, the processing means predeterminedly revises the output control signals to command a revised aircraft roll, whereby the aircraft is directed to roll appropriately to bring its flight path within the lateral envelope limits.

In a further aspect of the invention, the processing means further comprises means for further defining the lateral flare envelope term as having left and right lateral position rate limits as a function of the longitudinal position of the aircraft. The aircraft's actual lateral position rate is compared with the left and right position rate limits at the aircraft's actual longitudinal position. In the event that the aircraft's actual lateral position rate is outside of the lateral position rate limits and the lateral position limits, processing the means predeterminedly revises the output control signals to command a revised aircraft roll, whereby the aircraft is directed to roll appropriately to bring its flight path within the lateral envelope limits, Additional aspects of the invention will become apparent upon review of the specification and claims appended hereto.

DETAILED DESCRIPTION OF THE PREFERRED EMBODIMENT

Figure 1A:
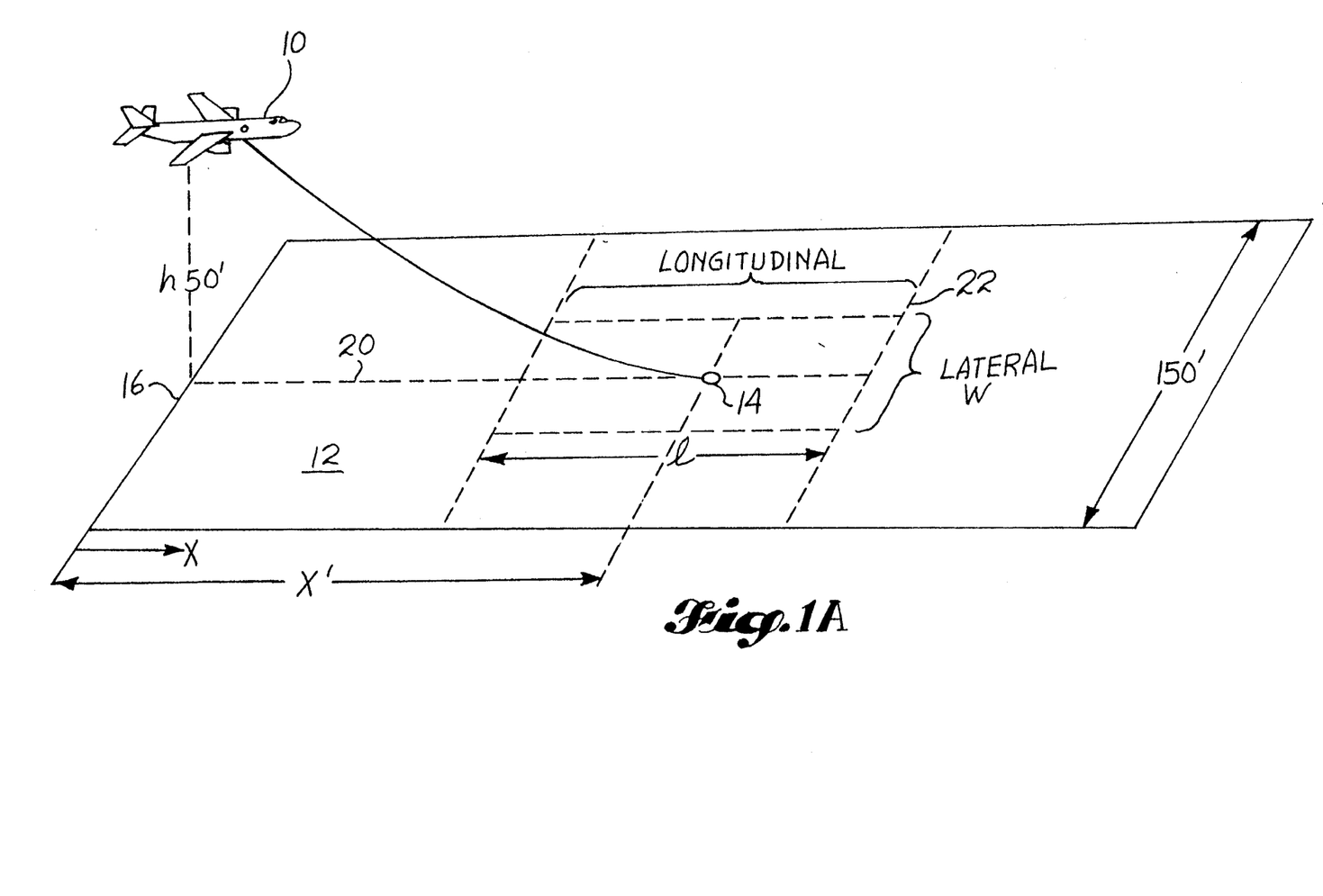
FIG. 1A is a perspective view of an aircraft initiating its flare out procedure upon landing on a runway, and illustrates the flare touchdown footprint.

FIG. 1 illustrates an aircraft 10 on landing approach to a runway 12. As depicted, the aircraft has reached an altitude H corresponding to the initiation of flare out or flare. The altitude H is, typically, fifty (50) feet. The aircraft's nominal touchdown point 14 is set at a nominal longitudinal distance X' from the beginning 16 of the runway 12. The lateral position of nominal touchdown point 14 is on the centerline 20 of the runway.

Figure 1B:
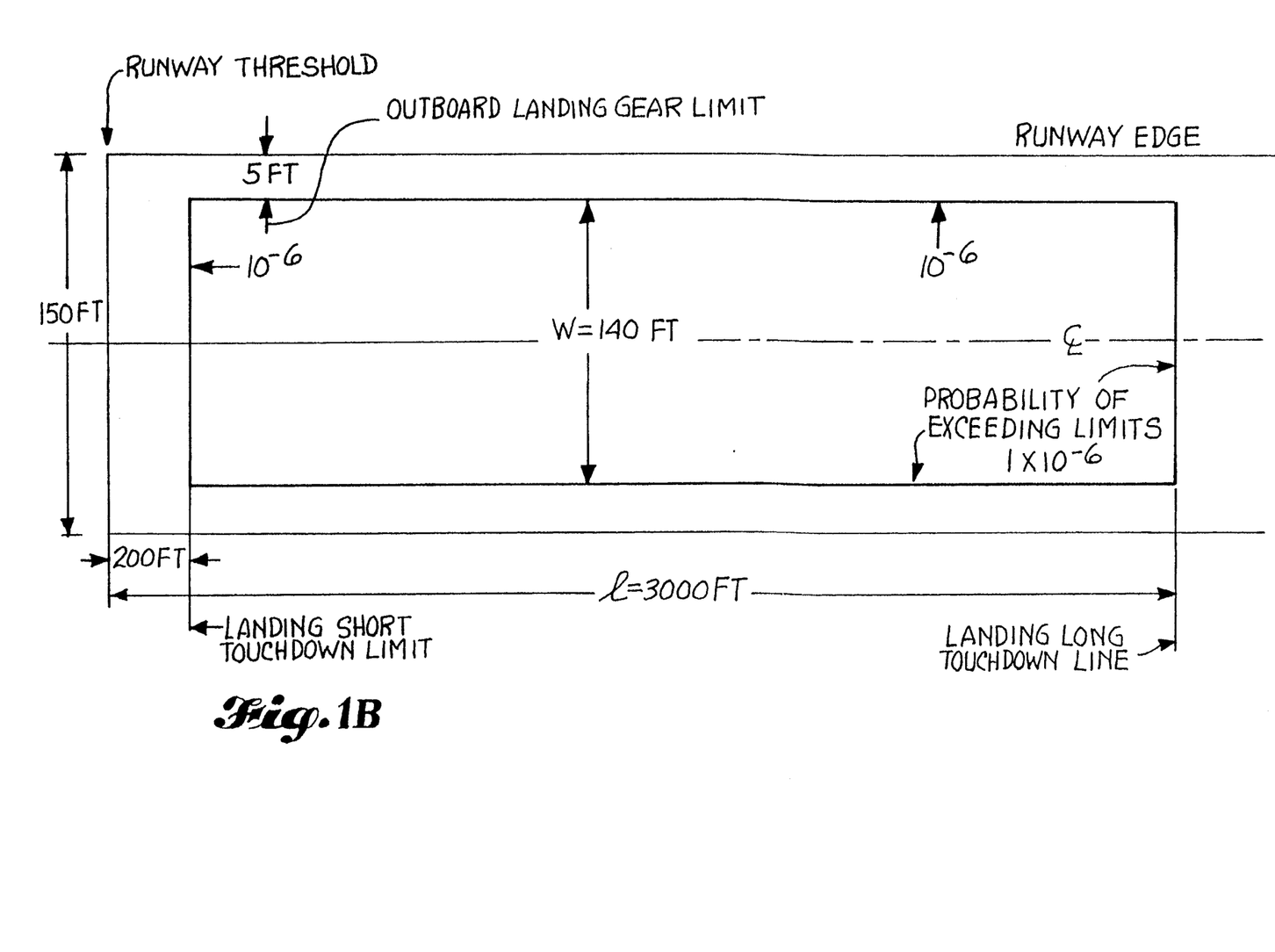
FIG. 1B is the touchdown footprint requirement specified by Joint Airworthiness Agency (JAA).

Various forces acting on the plane 10 prevent it from repeatedly landing at the touchdown point 14. As such, a flare "footprint" 22 has been developed, and is specified statistically by regulatory authorities. The footprint 22 is defined as including a lateral width w and a longitudinal length l. As an example, FIG. 1B shows the touchdown footprint requirements (w & l) specified by the Joint Airworthiness Agency (JAA).

For aircraft equipped with autopilots, the autoland control laws are normally capable of guiding the airplane to a touchdown within the dispersion footprint 22. However, in severe wind conditions, the autoland control laws may not be adequate to prevent drift of the aircraft outside of the footprint 22.

Previous attempts to solve this problem have proved unsatisfactory. One attempted solution was to increase the flare control law loop gain to thereby more precisely control the aircraft down its ideal flight path. Such high loop gains, however, create an unacceptably high frequency of control column oscillations—a result which is unacceptable to the flight crew.

A second approach to more precisely control flare dispersion has been to modify the flare biases (constants) or adjust the biases depending upon flight conditions at flare entry. Such an "open loop" approach has the limitation of being inadequate to correct for drift encountered when a severe wind disturbance occurs during the flare maneuver. Also, this approach requires complex control laws.

Figure 2:
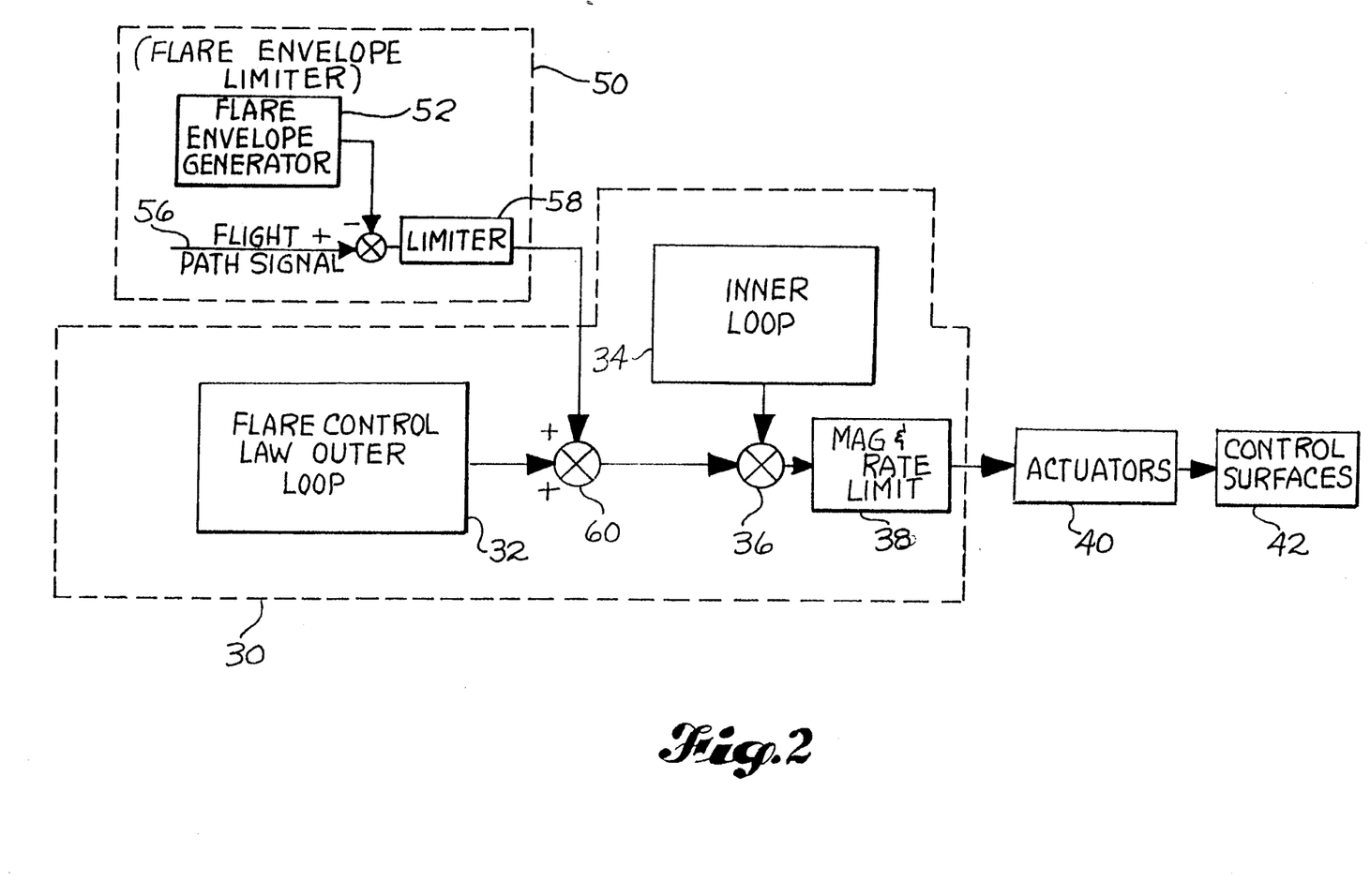
FIG. 2 is a block diagram of the overall aircraft flare control system.

FIG. 2 is a block diagram illustrating the principal components of the overall autoland control system according to the present invention. Shown is a conventional autopilot autoland control law system 30. This system, normally included within the operation of the autopilot computer, produces a flare control law outer loop control signal out of block 32. The outer loop signal from block 32 is summed with an inner loop control signal from block 34 in a summer 36. In the well known manner, the inner loop signal from block 34 damps oscillations of the aircraft itself and stabilizes long time constant oscillations. The combined inner and outer loop signals from summer 36 are magnitude and rate limited at block 38. Block 38 acts in the conventional manner to reduce the magnitude and rate of input signals such that they are suitable for driving the subsequent aircraft actuators 40 and corresponding control surfaces (such as elevators) 42.

A particular feature of the present invention is the addition to the control law of the flare envelope limiter 50. Flare envelope limiter 50 includes a flare envelope generator block 52. Flare envelope generator block 52 produces an output signal which defines an aircraft flare envelope. This flare envelope is compared in a summer 54 with the aircraft's actual flight path as an input signal on line 56. The generation of the aircraft's flight path signal on line 56 is described more fully hereinbelow with respect to FIGS. 4 and 6.

The output from the summing circuit 54 is passed to a limiter 58. Limiter 58 is designed such that it produces an output signal in the event that the aircraft's actual flight path as determined by flight path signal line 56 is outside of the prescribed flare envelope as determined by flare envelope generator 52. Otherwise, the output from limiter 58 is a constant, e.g. zero, value.

Thus, in the event that the flare envelope limiter 50 produces an output signal indicating that the aircraft is outside of the prescribed flare envelope, a signal is coupled to an adder 60 to be added with the flare control signal from outer loop flare control block 32. In this way, the flare control output signals as coupled to the actuators 40 and control surfaces 42 are revised in such a manner that the aircraft's flight path is redirected to within the prescribed flare envelope.

The improved autoland flare control system of FIG. 2 thus utilizes a conventional flare control law during normal conditions but augments the normal control law with a flare envelope limiter signal in the event that the aircraft has drifted outside of a prescribed flare envelope. In this way, neither the control law gains nor the biases of the standard flare control law system need be changed, with the corresponding adverse results described above, and yet the aircraft is maintained more closely on its flare path such that it is capable of touchdown within its prescribed dispersion footprint even under adverse wind conditions.

Figure 3:
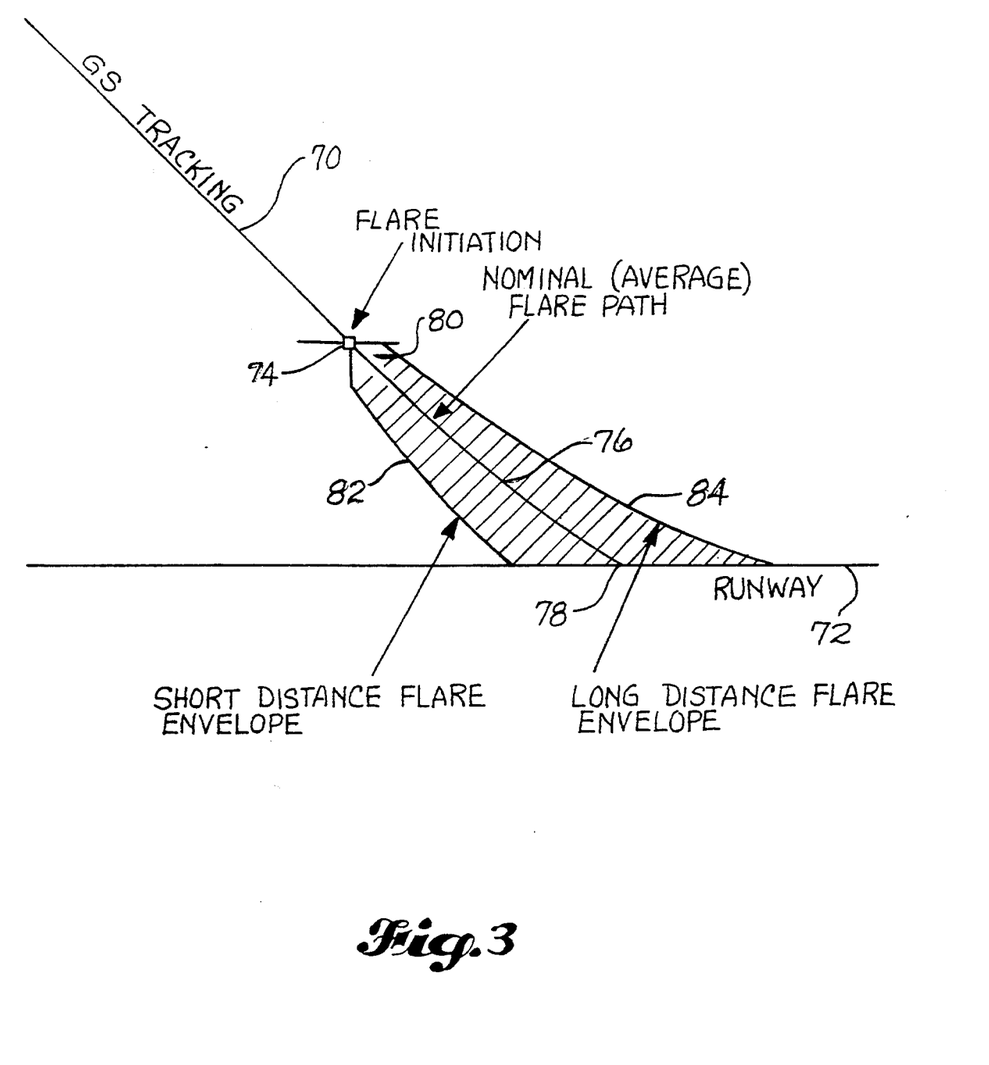
FIG. 3 is a side view of the aircraft flare envelope.

FIG. 3 is a cross sectional view which depicts the concept behind the longitudinal aspect of the flare envelope. Shown is the glideslope glide path 70 of an incoming aircraft to the runway 72. At a flare initiation point 74, which is typically at an altitude of approximately 50 feet, the aircraft deviates from its glideslope 70 to effectuate a nominal flare path which would result in touchdown at the nominal longitudinal position 78. The present invention utilizes a flare envelope indicated generally at 80, which, in the longitudinal direction, includes a short distance flare envelope 82 and a long distance flare envelope 84.

Referring again to FIG. 2, the flare envelope generator 52 generates the flare envelope 80. The aircraft's actual flare path is compared to the flare envelope 80 during the flare out maneuver. As will be discussed more thoroughly with respect to FIG. 4, in the event the aircraft is detected to be outside of the short distance flare envelope 82, the flare path envelope limiter 50 produces a signal which, when passed through the autoland control law 30, and actuators 40 creates a pitch-up command to the control surfaces 42 thereby redirecting the aircraft to within the flare envelope 80.

Similarly, if the aircraft's actual flight path is found to be outside of the long distance flare envelope 84, the flare path envelope limiter 50 produces a signal which, when coupled to the aircraft's autoland control law system 30, actuators 40 and control surfaces 42 results in a pitch-down command to also return the aircraft to within the flare envelope.

The flare envelope 80 is defined such that if the aircraft remains within the envelope, it is assured of touchdown within the prescribed dispersion footprint. The manner by which the flare envelope is determined for the preferred embodiment of the invention is described more thoroughly with respect to FIG. 5.

Figure 4:
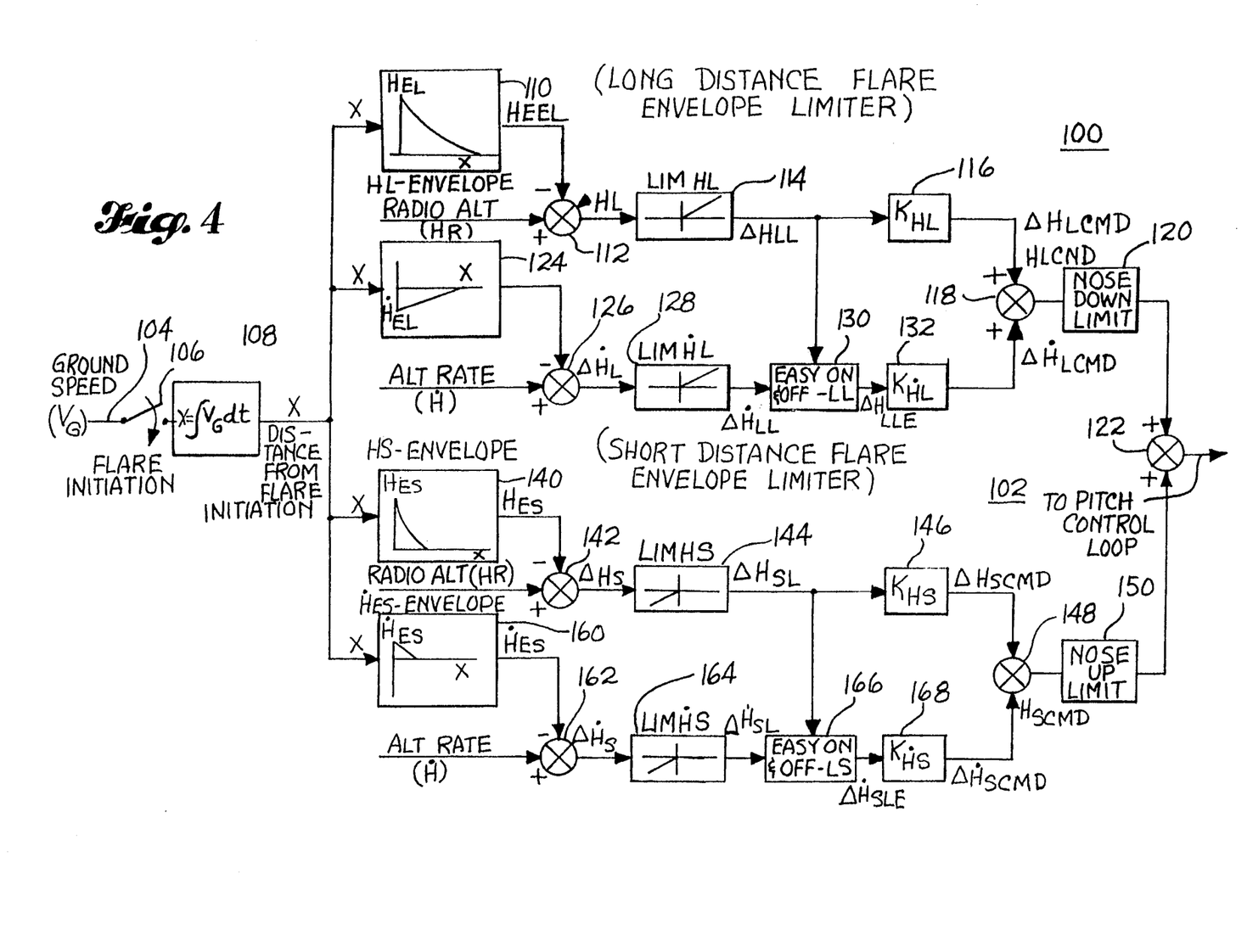
FIG. 4 is a detailed block diagram illustrating the longitudinal flare envelope limiter.

FIG. 4 is a detailed block diagram depicting the preferred embodiment of the longitudinal component of the inventive flare envelope limiter. The longitudinal flare envelope limiter includes two subcomponents, a long distance flare envelope limiter indicated generally at 100 and a short distance flare envelope limiter indicated generally at 102. The long distance flare envelope limiter 100 is designed to reduce a long flare distance which may be caused by severe tail winds or tail winds in conjunction with light airplane weight. The short distance flare envelope limiter subsystem is designed to lengthen a short flare distance which might be caused by severe headwinds or headwinds in conjunction with a heavy weight airplane.

Operation of the long distance flare envelope limiter 100 is understood as follows. Input to the system is a signal $V_g$ representing aircraft ground speed at an input 104. The ground speed signal $V_g$ is provided by the aircraft's on board inertial reference unit (IRU). At the point of flare initiation (point 74 in FIG. 3) a switch 106 closes whereby the ground speed signal $V_g$ is passed to an integrator 108. The output from integrator 108 is a signal X corresponding to the distance of the aircraft from the flare initiation point.

The signal X is fed to an HL-envelope block 110. Block 110, using a look-up table in the preferred embodiment of the invention, produces a flare envelope limit signal $H_{el}$ at its output for each distinct X signal input. The signal $H_{el}$ represents the long distance or upper altitude limit of the flare envelope at a given longitudinal position of the aircraft.

The upper altitude reference signal $H_{el}$ is summed in a negative sense with the aircraft's actual altitude $H_r$ provided by the aircraft's radio altimeter at summer 112. The difference between the signals $H_r$ and $H_{el}$ corresponds to a differential signal $H_L$ which in turn is fed to a limiter 114. As is discussed with respect to FIG. 2, the flare path envelope limiter only produces a revised control signal in the event that the aircraft is outside of the defined flare envelope. Thus, the transfer characteristic of the limiter 114 is to produce a non zero output only in the event that the aircraft's actual altitude is outside of the upper limit of the flare envelope $H_{EL}$.

In the event that the aircraft's actual altitude is outside of the long distance upper flare envelope limit, limiter 114 produces an output signal $H_{LL}$. This signal is passed through a gain factor $K_{HL}$ in gain block 116. As one of ordinary skill in the art will understand, the particular gains, such as that of gain block 116, will be tailored to a particular application.

The resulting output signal from gain block 116 is designated HLCMD which is fed to a summer circuit 118.

In this, the preferred embodiment of the invention, summer circuit 118 sums the signal $H_{LCMD}$ with an altitude rate-dependent signal, which is described hereinbelow.

The resultant signal out of summer 118, designated $H_{LCMD}$, is fed to a nose-down limiter block 120. Since the signal $H_{LCMD}$ represents a determination that the aircraft is outside of its upper long distance flare envelope limit, the signal $H_{LCMD}$ will be used to actuate a pitch-down of the aircraft. The nose down limiter block 120 limits any potential pitch-down commands which would exceed reference limits of the particular aircraft.

The signal out of nose down limiter block 120 is fed to a summer 122 which combines the long distance flare envelope limiter signal with any signals produced out of the short distance flare envelope limiter 102, as described below. The resulting signal out of summer 122 is fed to the aircraft's pitch control loop (see FIG. 2) to ultimately effectuate a pitch-down of the aircraft such that it returns to within its longitudinal flare envelope.

For many applications, the long distance flare envelope limiter as set forth above will satisfactorily return an aircraft to within the flare envelope to thereby assure that the aircraft will not touch down beyond its footprint. However, in some applications, an "anticipation signal" is required to effect a correction to the flight path to bring the aircraft within the flare envelope. As an example, assume that an aircraft drifts above the altitude envelope and that the error signal ($H_L$) is 10 feet and that altitude rate is $-10$ feet/second. In another case, assume that the aircraft drifts in a more severe wind and that the altitude error signal ($H_L$) is 10 feet but that the altitude rate is zero feet/second. Obviously, the latter example requires a larger nose-down command to return the aircraft to within the flare envelope. However, the altitude envelope limiter 110, as described above, does not distinguish between the above two cases.

Thus, as shown in FIG. 4, the long distance flare altitude limiter is further enhanced with the addition of an altitude rate envelope limiter 124. Here, the signal X, representing longitudinal position of the aircraft, is provided as an input to the altitude rate limiter block 124. In the preferred embodiment of the invention, the altitude rate limiter block 24 is a look-up table which, for every unique input signal X, produces an output corresponding altitude rate envelope limit signal $H_{EL}$. In many instances, since the altitude rate signal $H_{EL}$ provides only an anticipation signal, simple envelopes may be sufficient.

The altitude rate limit signal $H_{EL}$ is compared with the aircraft's actual altitude rate H (which is also provided by the aircraft's IRU), in a summing circuit 126. The output from summer 126 is a differential signal $H_L$. The $H_L$ signal is limited in a limiter block 128 such that block 128 only produces an output signal in the event that a pitch-down command will be required to return the aircraft to within its flare envelope. The resulting output signal from limiter block 128 ($H_{LL}$) is passed to the input of an easy on/off block 130. Easy on/off block 130 also receives as a control input the signal $H_{LL}$. If the $H_{LL}$ signal is non zero, the easy on/off block 130 closes thereby passing the $H_{LL}$ signal in a slow-on/slow-off manner to the gain block 132. The output from gain block 132 ($H_{LCMD}$) is fed to the summer 118 where it is summed with the altitude limit signal $H_{LCMD}$. In turn it is passed through the nose down limit block 120 and the summer 122 to the aircraft's pitch control loop.

Operation of the short distance flare envelope limiter 102 is understood as follows.

The aircraft's longitudinal position signal X is fed to the HS-envelope block 140. In this, the preferred embodiment of the invention, the HS-envelope block 140 uses a look-up table to produce an output signal $H_{ES}$ which is a reference altitude lower limit for the flare envelope for each unique input X signal. The lower limit flare envelope signal $H_{ES}$ is summed in a negative sense with the aircraft's actual altitude signal $H_R$ in a summer 142.

The resultant signal out of summer 142 is a differential signal $H_S$ which is fed to the limiter block 144. As compared with limiter block 114, limiter block 144 only produces an output non zero signal in the event that the aircraft is below its lower limit. The output signal from limiter block 144, designated $H_{SL}$, is passed through a gain block 146 to produce a command signal $H_{SCMD}$. This signal is in turn passed to a summer 148, where it is summed with an anticipation or rate term, as described hereinbelow. The resulting output from summer 148 is passed through a nose-up limiter 150. Since the command out of the short distance flare envelope limiter 102 will be to produce an aircraft pitch-up to thereby return the aircraft to within its flare envelope, the nose-up limiter 150 prevents pitch-up commands which exceed defined limits for the particular aircraft.

The output from nose-up limiter block 150 is summed in the summer 122 and provided to the aircraft's pitch control loop to thereby effectuate a revised control signal as described above.

As in the case of the long distance flare limiter 100, it may be beneficial in many applications to include an anticipation or rate-based signal to correct the aircraft's flight path to within the short distance flare envelope. Thus, as shown in FIG. 4, the aircraft longitudinal position signal X is also fed to an $H_{ES}$ envelope block 160. This block, which in the preferred embodiment corresponds to a look-up table, outputs a short distance rate signal $H_{ES}$ for each unique input longitudinal position signal X. The $H_{ES}$ signal is compared by summing it, in a negative sense, in a summer 162 with the aircraft's actual altitude rate signal H, as provided by the aircraft's on board IRU. The resulting output from summer 162 is a differential signal $H_S$ which is fed to a limiter block 164. Limiter block 164 has a transfer characteristic such that it passes a non zero output signal only in the event that a nose-up command must be generated to return the aircraft to within its flare envelope. The output signal $H_{SL}$ from the limiter block 164 is passed through the easy on/off block 166 to a gain block 168. As described above with respect to easy on/off block 130, the easy on/off block 166 only passes a signal to its output in the event of a positive $H_{SL}$ signal and then only with smooth transitions between the off and on states.

The resulting output signal from easy on/off block 166, designated $H_{SLE}$, is passed through a gain block 168 wherein a predetermined gain factor $K_{HS}$ is applied. The resulting output signal $H_{SCMD}$ is coupled through the summer 148, nose-up limiter 150 and the summer 122 to act as a pitch-up command.

To summarize, the control system set forth in FIG. 4 operates to define upper and lower altitude limits, and upper and lower rate limits, as a function of the longitudinal position of the aircraft. It then compares the aircraft's actual altitude and altitude rate with the corresponding upper and lower limits and, in the event the aircraft is outside of the limits, it revises the control signals applied to the aircraft's control surfaces to command a revised pitch, whereby the aircraft is directed to pitch up or down as appropriate to bring its flight path within the flare envelope limits.

In this, the preferred embodiment of the invention, the longitudinal flare envelope was determined statistically. This is understood with reference to FIG. 5. As before, with respect to FIG. 3, the aircraft glideslope 70 hits a flare initiation point 74. At that point, flare out is initiated and the aircraft is assumed to follow a mean, or nominal flare path 76 to a nominal touchdown point 78. The distance along the runway 72 is defined by a variable X, with X equaling zero corresponding to the aircraft longitudinal position occurring at the reference flare initiation point 74.

Figure 5:
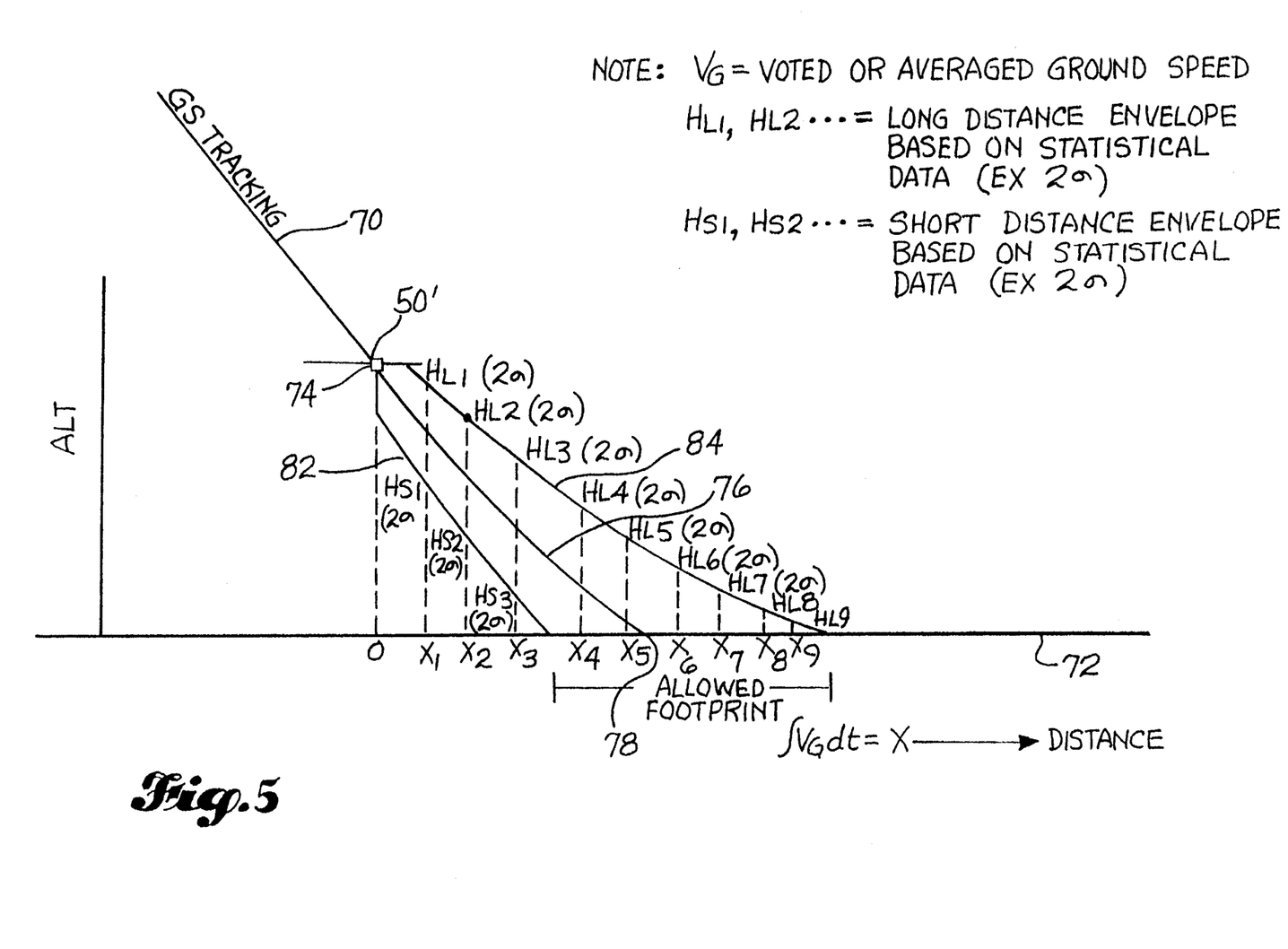
FIG. 5 is a statistical definition of the longitudinal flare envelope.

Both the upper flare limit 84 and the lower flare limit 82 were defined in the preferred embodiment of the invention statistically. The steps to derive the statistical flare envelope are as follows.

First, the autoland system without the benefit of the flare envelope limiter was assumed to exhibit two sigma a (or 95%) deviation from the mean. Thus, an initial envelope can be defined by defining an altitude envelope using mean values and standard deviations for a given distance X without the benefit of the flare envelope limiter. This is depicted in FIG. 5. Using this initial flare envelope, simulated autolands are conducted and new mean values and standard deviations are determined for the control system with the benefit of the flare envelope limiter. The resulting envelope is analyzed for its landing performance and, using these new means and standard deviations, the envelope is redefined. The above process is repeated until a satisfactory envelope (i.e., an envelope which assures that the aircraft will land within its dispersion footprint), is defined.

As those of ordinary skill in this art will understand, the flare envelope could also be defined nonstatistically suitable to any autoland control law performance requirements.

Figure 6:
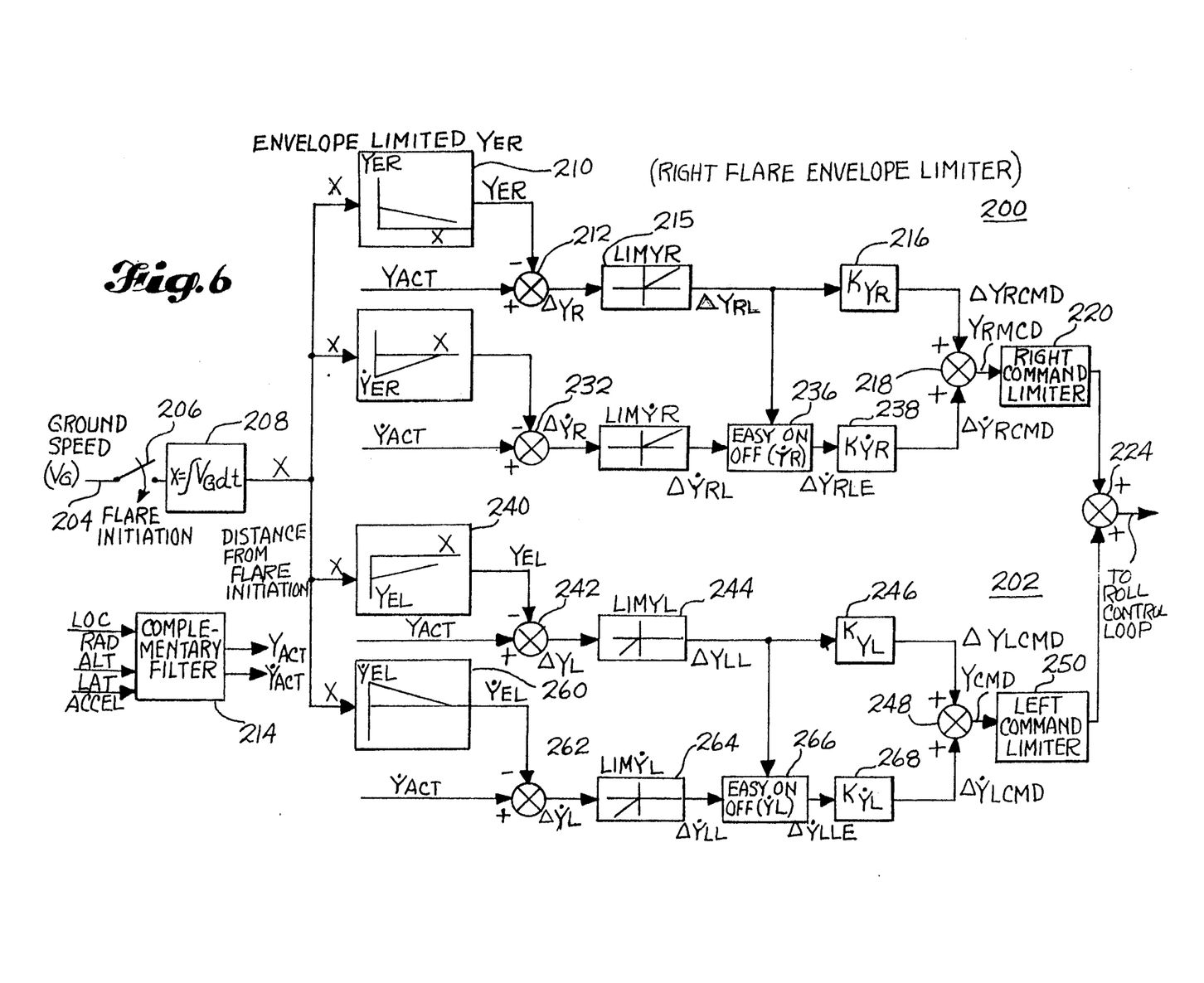
FIG. 6 is a detailed block diagram illustrating the preferred embodiment of the lateral flare envelope limiter.

FIG. 6 is a detailed block diagram illustrating the preferred embodiment of the lateral flare envelope limiter. Whereas the block diagram of FIG. 4 depicts the determination of the longitudinal envelope flare command, as can be seen from FIG. 1, the envelope also may include a lateral flare term depending upon basic control law 30 response.

The block diagram of FIG. 6 depicts both a right flare envelope limiter, generally designated at 200 and a left flare envelope limiter, generally designated at 202. The right flare envelope limiter 200 acts to produce control signals to move the aircraft toward the runway centerline by commanding a left wing down command when the aircraft drifts right beyond the flare envelope due to, for example, a severe cross wind. The left flare envelope limiter 202 produces a revised control signal to command a right wing down and thereby move an aircraft toward the runway centerline when the aircraft has drifted left due to, for example, a severe cross wind. As will be seen in the detailed description hereinbelow, the lateral flare envelope limiter of FIG. 6 has a structure similar to the longitudinal flare envelope limiter depicted in FIG. 4. The shape of the lateral envelope, however, may differ from that shown with respect to the longitudinal component since there is no special flare maneuver in the lateral axes other than maintaining the runway centerline. Thus, a simple straight line lateral envelope should be sufficient in most applications. It should also be noted that lateral envelope control may be effected by suitably actuating an aileron or rudder depending upon a particular airplane flight control system.

Referring to FIG. 6, a signal $V_g$ representing aircraft ground speed, as provided by the on board inertial reference unit, is input at input 204. At the point of flare initiation the signal $V_g$ is passed via a switch 206 to an integrator 208. The integrator 208 produces an output signal X which is zero at the point of flare initiation and increases corresponding to the longitudinal position of the aircraft from the flare initiation point.

The position signal X is then passed to the right flare envelope limiter block 210. Right flare envelope limiter block 210 in this, the preferred embodiment of the invention, constitutes a look-up table which produces an output signal $Y_{ER}$ corresponding to each unique input position signal X. Each signal $Y_{ER}$ represents the right flare envelope limit at the given aircraft position X. The system then compares the aircraft's actual lateral position $Y_{ACT}$ with the flare limit $Y_{ER}$ in a summer 212.

The manner by which the signal $Y_{ACT}$ corresponding to the aircraft's actual lateral distance from the center point of the runway is generated is understood with respect to block 214. Block 214 is a complimentary filter having as its inputs a localizer signal, generated by the aircraft's navigation receiver, a radio altitude signal and a lateral acceleration signal, which is provided by the aircraft's on board inertial reference system. In a manner well known in this art, the complimentary filter 214 produces an output signal $Y_{ACT}$ representing the aircraft's actual distance from the center point of the runway and also the first time differential of the lateral deviation signal, a signal $Y_{ACT}$.

The signal output from the summer 212 $Y_R$ represents the lateral position of the aircraft with respect to the outer right lateral limit. This signal is passed to a limiter block 215 which has a transfer characteristic to output a non zero value only when the aircraft is determined to be outside of its right lateral limit. This output signal $Y_{RL}$ is suitably amplified in a gain block 216 by a gain factor $K_{YR}$. The gain factor $K_{YR}$, as will be understood by those of ordinary skill in this art, is a function of the particular application. The resulting output from gain block 216 is a signal $Y_{RCMD}$ which is passed to a summer 218. As will be understood more fully with respect to the description hereinbelow, summer 218 combines the envelope limit signal $Y_{RCMD}$ with an antitipation signal $Y_{RCMD}$ to produce an output command signal. This command signal is then limited in the right command limiter block 220 to prevent command signals which would exceed defined limits of the aircraft. The resulting output signal from the right command limiter 220 is passed to a summer 224 which, as will be understood hereafter, sums such signal with the left flare envelope limiter 202 signal, to thereby produce a signal which, when coupled to the aircraft's roll control loop (see FIG. 2) causes the aircraft to execute a roll maneuver and thereby return it to within its lateral flare envelope.

To further enhance the right flare envelope limiter 200 command, an anticipation loop is included. Thus, the position signal X is passed to a right envelope rate block 230. Block 230, which in the preferred embodiment comprises a look-up table, produces an output lateral position rate term $Y_{ER}$ corresponding to each unique input position signal X. This $Y_{ER}$ signal is then added, in a negative sense, in summer 232 with the aircraft's actual lateral rate signal $Y_{ACT}$. The resulting output from summer 232 is a differential signal $Y_R$, which is fed to the limiter 234. As with the limiter 215, the limiter 234 has a transfer characteristic which only outputs a non zero value in the event that the lateral rate indicates a command is required to move the aircraft back within its right lateral limit.

The output signal from limiter 234 $Y_{RL}$ is passed to an easy on/off block 236. Easy on/off block 236 receives as its control input the output from limiter 215, $Y_{RL}$. Thus, the easy on/off circuit 236 only passes the $Y_{RL}$ as a command to the aircraft's control system in the event that the $Y_{RL}$ signal indicates that the aircraft has exceeded its right command limit. As with the easy on/off blocks 130, 166 shown in FIG. 4, the transfer characteristic of block 236 prevents rapid transitions between the off and on states. The output signal $Y_{RLE}$ from easy/on block 236 is gain factored in gain block 238 by an appropriate gain factor $K_{YR}$. It is then passed as a command input $Y_{RCMD}$ to the summer 218 where, as stated before, it is summed with the signal $Y_{RCMD}$ and thereafter passed to right command limiter 220 and summer 224 for use as an aircraft control surface command.

The left flare envelope limiter 202 operates in a manner similar to the right flare envelope limiter 200. The aircraft longitudinal position signal X is passed to the left envelope limiter block 240. Here, by use of a look-up table in the preferred embodiment, an output left envelope limit signal $Y_{EL}$ is produced for each position input signal X. The left lateral envelope signal $Y_{EL}$ is summed in a negative sense with the aircraft's actual lateral position signal $Y_{ACT}$ in a summer 242. The output from summer 242 is a differential signal $Y_L$ which is passed to the left limiter block 244. Limiter block 244 has a transfer characteristic such that it passes a non zero output signal only in the event that the aircraft has exceeded the left lateral limit. The output signal $Y_{LL}$ from limiter 244 is suitably amplified in gain block 246 by a gain factor $K_{YL}$. The resulting output from gain block 246 is a signal $Y_{LCMD}$ which is passed to a summer 248. In a manner described below, summer 248 combines the command signal $Y_{LCMD}$ with a corresponding left rate term $Y_{LCMD}$ to produce the resultant left command signal $Y_{LCMD}$. This command signal is then passed to the left command limiter block 250 to limit the signal within defined limits for the particular aircraft and subsequently passed to the summer 224 to effect an adjusted aircraft roll as described above.

As with the right flare envelope limiter 200, the left flare envelope limiter is further enhanced by use of an anticipation or rate signal. Thus, the aircraft longitudinal position signal X is fed to the left lateral rate limiter block 260. This block, which incorporates a look-up table in accordance with the preferred embodiment of the invention, outputs a left lateral rate limit signal $Y_{EL}$ for each longitudinal position signal X. The left flare lateral limit rate signal $Y_{EL}$ is summed in a negative sense with the aircraft's actual lateral rate signal $Y_{ACT}$ in a summer 262. The output from summer 262 is a differential signal $Y_L$ which is fed to a limiter 264. Limiter 264 has a transfer characteristic to output a non zero value only if the input signal $Y_L$ represents a rate tending to move the aircraft outside of its left lateral envelope limit. The output from limiter block 264 is a signal $Y_{LL}$ which is fed to easy on/off block 266. Easy on/off block 266 only passes signals at its input to its output in response to the $Y_{LL}$ signal being non negative, thereby indicating that the aircraft has exceeded its left lateral flare envelope. Also, easy on/off block 266 prevents rapid transitions between the off and on states. The output signal $Y_{LLE}$ from block 266 is suitably amplified by a gain factor $K_{YL}$ in gain block 268. The resultant signal $Y_{LCMD}$ is the left lateral rate command signal which, when summed in summer 248 with the signal $Y_{LCMD}$ produces the output lateral command signal $Y_{LCMD}$. This command signal, as described above, is thereafter limited in limiter 250 and summed with the right flare envelope limiter 200 produced signal in summer 224 to appropriately revise the control signals to the aircraft's control surfaces causing it to roll back within its left lateral flare envelope limit.

In summary, an improved flare control system has been described which includes a flare envelope limiter. The disclosed control system can correct for deviations from the flare path when an aircraft drifts outside of a predetermined envelope. The present system handles extreme landing conditions by augmenting a simple system utilizing standard control laws. Since conventional autoland flare control laws may be employed under normal conditions, loop gains can be maintained at a level which avoids control column or wheel oscillation. In addition, the shape of the flare envelopes can be selected statistically or nonstatistically as suitable to a particular autoland performance requirement.

In addition, existing autoland flare control systems can be modified to include the envelope limiters to thereby increase the precision of aircraft touchdown dispersions, without encountering adverse side affects.

While a preferred embodiment of the invention has been described in detail, it should be apparent that many modifications and variations thereto are possible, all of which fall within the true spirit and scope of the invention.

We claim:

1. A control system for directing aircraft flight path during flare to a runway comprising:

input means adapted to receive predetermined aircraft flight path status signals; and processing means for processing said input means which are received from said aircraft flight path status signals and producing output control signals adapted the coupled aircraft actuators to control aircraft flight along a nominal flare path, said processing means further comprising means for:

a) defining an aircraft flare envelope;
   b) comparing the aircraft's actual flight path with said flare envelope and, in the event the aircraft is outside of said flare envelope;
   c) predeterminedly revising said output control signals to redirect the aircraft's flight path within said flare envelope.

2. The control system of claim 1 wherein said processing means further comprises means for defining said flare envelope as upper and lower altitude limits as a function of the longitudinal position of the aircraft, comparing the aircraft's actual altitude with said corresponding upper and lower altitude limits at the aircraft's actual longitudinal position and, in the event the aircraft is outside of said limits, predeterminally revising said output control signals to command a revised aircraft pitch, whereby the aircraft is directed to pitch up or down as appropriate to bring its flight path within said flare envelope limits.

3. The control system of claim 2 wherein said processing means further comprises means for further defining said flare envelope as having upper and lower altitude rate limits as a function of longitudinal position of the aircraft, comparing the aircraft's actual altitude rate with said upper and lower altitude rate limits at the aircraft's actual longitudinal position and, in the event the aircraft's altitude rate is outside of said altitude rate envelope limits, predeterminally revising said output control signals to command a revised aircraft pitch, whereby the aircraft is directed to pitch up or down as appropriate to bring its flight path within said flare envelope limits.

4. The control system of either one of claims 2 or 3 wherein said processing means further comprises means for further defining said flare envelope as including a lateral flare envelope term having left and right lateral position limits as a function of the longitudinal position of the aircraft comparing the aircraft's actual lateral position with said left and right lateral envelope limits at the aircraft's actual longitudinal position and, in the event the aircraft is outside of said lateral envelope limits, predeterminally revising said output control signals to command a revised aircraft roll, whereby the aircraft is directed to roll appropriately to bring its flight path within said lateral envelope limits.

5. The control system of claim 4 wherein said processing means further comprises means for further defining said lateral flare envelope term as having left and right lateral position rate limits as a function of the longitudinal position of the aircraft, comparing the aircraft's actual lateral position rate with said left and right position rate limits at the aircraft's actual longitudinal position and, in the event that the aircraft's actual lateral position rate is outside of said lateral position rate limits and said lateral position limits, predeterminally revising said output control signals to command a revised aircraft roll, whereby the aircraft is directed to roll appropriately to bring its flight path within said lateral envelope limits.

6. The control system of any one of claims 1 through 3 wherein said processing means further comprises means for storing said flare envelope limits in an electronic look-up table.

7. The control system of claim 4 wherein said processing means further comprises means for storing said left and right lateral position limits in an electronic look-up table.

8. The control system of claim 5 wherein said processing means further comprises means for storing said left and right lateral position rate limits in an electronic look-up table.

9. The control system of any one of claims 1 through 3 wherein said flare envelope limits are statistically determined.

10. The control system of claim 4 wherein said left and right lateral position limits are statistically determined.

11. The control system of claim 5 wherein said left and right lateral position rate limits are statistically determined.

12. The control system of any of the claims 1 through 3 wherein said processing means further comprises means for determining the aircraft's actual longitudinal position by integrating aircraft airspeed.

13. The control system of claim 4 wherein said processing means further comprises means for determining the aircraft's actual longitudinal position by integrating aircraft airspeed.

14. The control system of claim 5 wherein said processing means further comprises means for determining the aircraft's actual longitudinal position by integrating aircraft airspeed.

15. The control system of any of claims 1 through 3 in further combination with actuator means for receiving said output control signals and control surface means connected to the actuator means, whereby actuator means responds to the output control signals from the control system to predeterminedly position said control surface means.

16. The control system of claim 4 in further combination with actuator means for receiving said output control signals and control surface means connected to the actuator means, whereby actuator means responds to the output control signals from the control system to predeterminedly position said control surface means.

17. The control system of claim 5 in further combination with actuator means for receiving said output control signals and control surface means connected to the actuator means, whereby actuator means responds to the output control signals from the control system to predeterminedly position said control surface means.

18. A method for directing aircraft flight path during flare of the aircraft to a runway comprising the steps of:
   a) providing input means adapted to receive predetermined aircraft flight path status signals; and
   b) providing processing means for processing said input means received aircraft flight path status signals and producing output control signals adapted to be coupled to aircraft actuators to control said aircraft flight, along a nominal flight path, said processing means further comprising the steps of:
      i) defining an aircraft flare envelope;
      ii) comparing the aircraft's actual flight path with said flare envelope and, in the event the aircraft is outside of flare envelope;
      iii) predeterminedly revising said output control signals to redirect the aircraft's flight path to within said flare envelope.

19. The method of claim 18 further comprising the steps of:
   defining said flare envelope as upper and lower altitude limits as a function of the longitudinal position of the aircraft;
   comparing the aircraft's actual altitude with said corresponding upper and lower altitude limits at the aircraft's actual longitudinal position and, in the event the aircraft is outside of said limits;
   predeterminedly revising said output control signals to command a revised aircraft pitch,
   whereby the aircraft is directed to pitch up or down as appropriate to bring its flight path within said flare envelope limits.

20. The method of claim 19 further comprising the steps of:
   defining said flare envelope as having upper and lower altitude rate limits as a function of longitudinal position of the aircraft;
   comparing the aircraft's actual altitude rate with said upper and lower altitude rate limits at the aircraft's actual longitudinal position and, in the event the aircraft's altitude rate is outside of said altitude rate envelope limits;
   predeterminedly revising said output control signals to command a revised aircraft pitch,
   whereby the aircraft is directed to pitch up or down as appropriate to bring its flight path within said flare envelope limits.

21. The method of either one of either one of claims 19 or 20 further comprising the steps of:
   defining said flare envelope as including a lateral flare envelope term having left and right lateral position limits as a function of the longitudinal position of the aircraft; comparing the aircraft's actual lateral position with said left and right lateral envelope limits at the aircraft's actual longitudinal position and, in the event the aircraft is outside of said lateral envelope limits;
   predeterminedly revising said output control signals to command a revised aircraft roll,
   whereby the aircraft is directed to roll appropriately to bring its flight path within said envelope limits.

22. The method of claim 21 further comprising the steps of:
   defining said lateral flare envelope term as having left and right lateral position rate limits as a function of the longitudinal position of the aircraft;
   comparing the aircrafts actual lateral position rate with said left and right position rate limits at the aircraft's actual longitudinal position and, in the event that the aircraft's actual lateral position rate is outside of said lateral position rate limits and said lateral position rate limits;
   predeterminedly revising said output control signals to command a revised aircraft roll,
   whereby the aircraft is directed to roll appropriately to bring its flight path within said envelope limits.

* * * * *